United States Patent Office 2,930,706
Patented Mar. 29, 1960

2,930,706

PREPARATION AND PACKING OF CITRUS FRUIT PRODUCTS

Richard W. Moulton, Norfolk, Mass., assignor to The Institutum Divi Thomae Foundation, Cincinnati, Ohio, a corporation of Ohio not for profit No Drawing. Application February 27, 1959
Serial No. 795,926

9 Claims. (Cl. 99—186)

This invention relates to the preparation and packing of citrus fruit products, especially sections of the given citrus fruit immersed in the juice of the same fruit. The products of the invention are particularly intended for detail distribution as in pint, gallon and other jars, jugs and containers, wherein the product under ordinary refrigeration is maintained in substantially the natural state as to the flavor.

Among the several causes for objectionable change in the flavor of citrus fruit products perhaps the most important is found to reside in the enzymatic action of the naturally inherent enzymes or spores present in the released juice and which unless destroyed or controlled soon lead to the starting of fermentation and attendant flavor change. Another factor is bacterial action. This may be reduced or avoided by proper attention to sterile conditions of processing. A third factor is oxidation, the harmful effects of which may be reduced by minimum exposure of the citrus items to air. A fourth factor is the inherent natural oil, objectionable effects of which may be obviated or delayed by refrigeration and by selection of fruit for non-excessive oil content.

The present invention is primarily directed to the avoidance of objectionable enzymatic action. In the process of so doing, the other harmful factors mentioned are minimized by observing accepted sanitary precautions as to apparatus and working conditions, avoidance of undue exposure to air, and selection of suitable fruit for processing.

The several main steps of the novel process of the invention comprise the preparation of the citrus juices under a treatment which kills or renders inactive the enzymes, spores, yeasts and such potentially deleterious organic life, the preparation of the fruit sections or segments either with or without specific counteraction of the enzymatic process, and the combining and packing of the fruit juice and the fruit sections of the same fruit type into the resultant commercial product. The invention is mainly concerned with fruits of the citrus family and particularly oranges and grapefruit.

In carrying out the present invention the fruit juice is extracted in any known or preferred manner producing bulk quantities of the juice in its natural state, under appropriate working conditions as to sterileness of equipment and the minimizing of air contact.

The extracted natural juice, preferably without dilution or concentration, is subjected to an enzyme-killing treatment. This may be accomplished by a properly limited pasteurization such as at a temperature not exceeding 175° F. for a period of not over 2 minutes, as for example in Cherry-Burrel or other standard flash pasteurizing equipment. Under the preferred process the treatment of the juice is effected by irradiation with light rays selected mainly from the ultraviolet band, the juice being flowed in a relatively thin sheet along a path appropriately extended to subject the juice to the enzyme-killing action of the irradiating ultra-violet or other enzymecidal rays for the determined minimum time period appropriate.

Such treatment of the juice may be carried out in accordance with the teachings of Dr. George Sperti of Cincinnati, Ohio, The Institutum Divi Thomae Foundation of the same location, and other workers and contributors to the literature of sterilization by the use of rays outside the visible spectrum.

The teachings referred to above are set forth in detail in U.S. Patent No. 2,824,014, granted February 18, 1958, to The Institutum Divi Thomae Foundation as assignee of George Sperti. The irradiation process is predicated on exposure of the juice to high intensity ultraviolet radiation in the region of about 2600 to 2900 A. for a very short time, for example 10–15 seconds or less. Flowing the juice in a thin sheet, say within the approximate limits of 1⁄32" and 1⁄8" thick, past the source of radiation aids in securing exposure of the greater part if not all of the juice to the effective radiation in the desired short time and at the same time minimizes the danger of undesirable side effects such as oxidation, off-flavors, etc. With such short exposure, relatively high intensity in the effective range mentioned above is necessary for adequate inactivation, whereas energy of shorter wave lengths below about 2600 A. should be minimized because it tends to cause undesirable changes in the juice. The energy distribution of given sources of ultraviolet light, such as mercury arcs, can be controlled to a substantial degree by the design of the source and its operation, and if desired cutoff filters can be employed to reduce the emission at the undesired shorter wave lengths.

By way of example, the aforesaid patent discloses the following installation and operating conditions:

Quartz mercury arcs enclosed in Corex envelopes were used. The arc tubes were 1" in diameter and 50" long, the arc length between the electrodes being 48¼". Each tube was operated by a transformer and reactor rated at 850 volts, open circuit, under the following conditions:

| | |
|---|---|
| Tube watts | 3000 |
| Operating amps | 6.7 |
| Starting amps | 9.2 |
| Arc volts | 525 |

There was practically no emission below 2800 A., and the total ultraviolet energy emitted between 2800 A. and the visible region (above 3800 A.) was less than two percent of the wattage of the lamp, but approximately one third of this emitted ultraviolet energy was concentrated in the region of 2800–3200 A.

These lamps were placed above and transverse to the direction of flow of a layer of orange juice about 1⁄32" thick, the lamps being located 6" above the surface of the juice parallel to each other and 30" apart. The width of the flowing layer or stream of juice was approximately the same as the length of the tubes, i.e., 49½". Under these conditions an average exposure time of about 5 seconds was sufficient; this was attained by making the irradiation pan or trough 146" long and flowing the layer of juice over the pan at the rate of 650 gallons per hour. Four lamps were required to cover the area of the pan effectively.

The lamps described above have been found to be even more effective without Corex glass filters, the emission of energy of objectionably short wave lengths being too low to have material adverse effects. Without the filters, each lamp produced about 7500 microwatts in the useful wave length band of 2600 A. to 2900 A., as compared with only about one-third as much in the neighboring shorter wave length band of 2600 A. down to about 2200 A. and negligible amounts below 2000 A.

Such irradiated or other non-enzymatic citrus juice in sealed tanks or containers may be shipped under suitable refrigeration say at 30° to 40° F. to any convenient location for the production of the composite product of the invention and the completion of the method concerned. Or the latter may be accomplished at the same point or station where the extracted juice is rendered non-enzymatic.

In thus continuing the process other natural fruit of the same type as the particular juice to be employed, for example oranges or grapefruit, is assembled and cleaned as by washing. The skin or rind of the fruit is removed and the individual sections or segments of the fruit body are divided from each other under suitable sanitary working conditions. This may be accomplished mechanically or by hand labor or combinations of the two. In the resulting accumulation of bulk quantities of the individual citrus fruit sections these latter present the multitudinous juice sacs of which each segment is composed in more or less integral condition. Unavoidably however at least some of the external juice sacs are ruptured so that some free juice is present at the surface of the segments. Otherwise, if the natural juice content in the course of the removal of the segments were preserved intact within the relatively minute juice sacs, no problem of enzymatic action within the segments would be involved. Therefore in keeping with the invention the individual fruit segments, and particularly those having a relatively small quantity of the juice superficially exposed, may be directly combined with the non-enzymatic juice.

This is accomplished either by inserting the fruit sections into a container, for example a 1 gallon glass jug, to a roughly filling but non-compacted volume and then flooding the contained segment mass with the non-enzymatic juice, to an approximately full or overflowing condition of the container. Depending somewhat upon the quality of the sections themselves as to juice fullness, the resulting product content of the 1 gallon container cited merely by way of example will be for instance between about 1 pint and and 1 quart of the juice, the balance of the volume being made up of the fruit segments of the same fruit type as the juice. A suitable conjoint product also has been had by first placing the appropriate amount of juice in the container and then immersing the fruit segments into the juice, in the similar relative proportions.

While thus in some circumstances the product and process may comprise the incorporation of natural fruit segments with the non-enzymatic juice of the same fruit, which latter may be had by pasteurization but preferably by irradiation as described, best results have been had by preparatory counter-enzymatic treatment of the fruit sections themselves. Such treatment aims to counteract the enzymatic action of any free juice at the surface of the fruit segments, that is, juice which has been released from its naturally sealed status within the juice sacs.

As previously explained in connection with the juice preparation, such treatment may be had by pasteurization. It is more conveniently accomplished by subjecting the fruit segments to ultraviolet or other enzyme-killing light rays. In actual practice this has been attained by exposure of the fruit sections to the sterilizing action of the rays from the suitable light source, upon both main faces of the sections and continuing such subjection for the appropriate relatively brief interval as previously mentioned. Relative travel of the light source and the fruit sections and the exposure of the latter upon both main faces may be variously had whether by travel of the light source or by passage of the sections through or subject to the radiation therefrom. Conveniently this has been accomplished by spreading the fruit sections upon a traveling conveyor moving below an extended source of the irradiation and by inverting the conveyed sections to expose the other faces thereof while continuing the subjection to irradiation or passing the sections below a further source thereof. In this manner the citrus fruit sections are themselves flavor-preserved and rendered non-enzymatic prior to their incorporation with the encompassing non-enzymatic juice of the same fruit type.

The incorporation of the sterilized or non-enzymatic fruit sections with the enclosing volume of the sterile or non-enzymatic like-type fruit juice may be accomplished in the manner already described, whether by addition of the juice to the segment mass in the containers or by a reverse procedure.

The resultant composite product comprising the mass of citrus fruit sections flooded, immersed in or encompassed by the non-enzymatic like-juice is sealed in the given container in any known or preferred fashion as appropriate to the type of container. It is then stored and distributed under commonly available refrigeration desirably maintained at or within the general range of 30° to 40° F.

It will be understood that my invention, either as to product or method, is not limited to the exemplary embodiments or steps herein illustratively described, and I set forth its scope in my following claims.

What is claimed is:

1. The process of preparing and packaging a citrus fruit product which comprises extracting citrus fruit juice, rendering the enzymes in the juice inactive, separating individual citrus fruit sections from fresh citrus fruit by removal of the fruit skin and division of the fruit body into sections, and thereafter packing a mass of said sections and an immersing volume of said exposed juice in a container and closing the latter.

2. The process of preparing and packaging a citrus fruit product which comprises extracting citrus fruit juice, exposing said juice to ultraviolet radiation to inactivate the enzymes therein, separating individual citrus fruit sections from the fresh fruit by removal of the fruit skin and division of the fruit body into sections, and thereafter packing a mass of said sections and an immersing volume of said exposed juice in a container and closing the container.

3. The process of preparing and packing a citrus fruit product which comprises extracting citrus fruit juice, exposing said juice to ultraviolet radiation to inactivate the enzymes therein, separating individual citrus fruit sections from the fresh fruit by removal of the fruit skin and division of the fruit body into the sections, exposing the fruit sections to ultraviolet radiation to render them non-enzymatic, and thereafter combining a mass of the exposed fruit sections and an immersing volume of said exposed juice in a container and closing the latter.

4. The process of preparing and packaging a composite citrus fruit product which comprises extracting the citrus fruit juice, rendering the juice non-enzymatic, separating from other citrus fruit of the same type the individual friut sections by removal of the fruit skin and dividing the fruit body into the sections, rendering the fruit sections non-enzymatic by a sterilizing procedure in which chemical additive and undue heating are avoided, and thereafter combining a loosely filling mass of the fruit sections and an immersing volume of the non-enzymatic like-fruit juice in a container and closing the latter.

5. A process for the preservation of orange sections which comprises packing orange sections which comprise segments of the edible juicy pulp of the friut freshly separated from the relatively inedible outer skin and web-like partitions radiating from the core of the fruit in containers, substantially filling the containers with orange juice which has been exposed to ultraviolet radiation to inactivate enzymes, and closing the filled containers.

6. The process of preparing and packaging an orange product which comprises extracting orange juice, exposing said juice to ultraviolet radiation to inactivate the enzymes therein, separating individual orange sections from fresh oranges by removal of the fruit skin and dividing the fruit body into sections and thereafter packing a mass of said sections and an immersing volume of said exposed juice in a container and closing the latter.

7. The process of preparing and packaging an orange product which comprises extracting orange juice, rendering the enzymes in said juice inactive by flash pasteurization of the juice at a temperature not exceeding 175° F. for a period of not over two minutes, separating individual orange sections from fresh oranges by removal of the fruit skin and division of the fruit body into sections, and thereafter packing a mass of said sections and an immersing volume of said exposed juice in a container and closing the latter.

8. Packaged citrus fruit sections in the form of a container substantially filled with citrus fruit sections which comprise segments of the edible juicy pulp of the citrus fruit freshly separated from the relatively inedible outer skin and web-like partitions radiating from the core of the fruit and with citrus fruit juice in which enzymes have been inactivated by exposure to ultraviolet radiation, the contents being sealed in the container.

9. Packaged fresh orange sections in the form of a container substantially filled with orange sections which comprise segments of the edible juicy pulp of the fruit freshly separated from the relatively inedible outer skin and web-like partitions radiating from the core of the fruit and orange juice in which enzymes have been inactivated by exposure to ultraviolet radiation, the contents being sealed in the container.

References Cited in the file of this patent

UNITED STATES PATENTS

| | | |
|---|---|---|
| 1,182,213 | Ryan | May 9, 1916 |
| 1,575,148 | Carbone | Mar. 2, 1926 |
| 1,934,810 | Mazzola | Nov. 14, 1933 |
| 1,975,991 | Tranin et al. | Oct. 9, 1934 |
| 2,151,645 | Stephens et al. | Mar. 21, 1939 |
| 2,325,360 | Ayers et al. | July 27, 1943 |
| 2,510,679 | Bruce | June 6, 1950 |
| 2,561,784 | Garcia | July 24, 1957 |